United States Patent
Minkkinen et al.

(10) Patent No.: US 7,175,820 B2
(45) Date of Patent: Feb. 13, 2007

(54) NATURAL GAS DEACIDIZING AND DEHYDRATION METHOD

(75) Inventors: Ari Minkkinen, Saint Nom la Breteche (FR); Alexandre Rojey, Rueil Malmaison (FR); Fabrice Lecomte, Rueil Malmaison (FR)

(73) Assignee: Institut Francais du Petrole, Rueil Malmaison Cedex (FR)

(*) Notice: Subject to any disclaimer, the term of this patent is extended or adjusted under 35 U.S.C. 154(b) by 96 days.

(21) Appl. No.: 10/729,965

(22) Filed: Dec. 9, 2003

(65) Prior Publication Data
US 2004/0115109 A1    Jun. 17, 2004

(30) Foreign Application Priority Data
Dec. 10, 2002   (FR) .................................. 02 15569

(51) Int. Cl.
*B01D 53/14* (2006.01)
(52) U.S. Cl. .................................................... 423/228
(58) Field of Classification Search ............. 423/242.7, 423/220, 228, 229
See application file for complete search history.

(56) References Cited

U.S. PATENT DOCUMENTS

| | | | |
|---|---|---|---|
| 4,997,630 A | | 3/1991 | Wagner |
| 5,462,721 A | * | 10/1995 | Pounds et al. ............... 423/226 |
| 5,622,681 A | * | 4/1997 | Grierson et al. ............. 423/228 |
| 5,693,297 A | * | 12/1997 | Turner et al. ................ 423/210 |

FOREIGN PATENT DOCUMENTS

| | | |
|---|---|---|
| GB | 2191419 | 12/1987 |
| WO | 9804337 | 2/1998 |

* cited by examiner

*Primary Examiner*—Edward M. Johnson
(74) *Attorney, Agent, or Firm*—Antonelli, Terry, Stout and Kraus, LLP.

(57) ABSTRACT

The natural gas is deacidized by contacting in zone 3 with a solvent containing amine in aqueous solution. The gas is then dehydrated by contacting in zone 4 with a solvent very rich in amine. After the contacting operations, the solvent containing $H_2S$ and water is expanded in drum 9, then regenerated in column 11. Part of the regenerated solvent is sent to zone 3. Another part of the regenerated solvent is vacuum distilled in column 18 so as to produce an amine-rich solvent that is sent to zone 4.

19 Claims, 2 Drawing Sheets

NATURAL GAS DEACIDIZING AND DEHYDRATION METHOD

FIELD OF THE INVENTION

The present invention relates to the sphere of treatment of a natural gas from a petroleum production well. It provides a natural gas deacidizing and dehydration method.

During production of a natural gas intended to be marketed, the necessity of reducing the hydrogen sulfide content (H2S) to some parts per million is essential for safety reasons. Since carbon dioxide ($CO_2$) is not a poison, it can be allowed in proportions of some volume percents. The $CO_2$ content is only limited by considerations of heat capacity of the gas and of pressure drop in the pipelines. Natural gas dehydration is necessary to prevent pipeline corrosion and/or to prevent formation of ice and hydrate plugs.

BACKGROUND OF THE INVENTION

Methods of the prior art provide extraction of the acid gases ($H_2S$ and $CO_2$) by means of a treatment using a solvent containing amines, for example methyldiethanolamine (MDEA), which has a very high affinity with $H_2S$.

The amines used by natural gas treating methods are in aqueous solution notably to modify the chemical equilibria, to reduce vapour losses, to reduce the regeneration temperature at atmospheric pressure and to limit co-absorption of hydrocarbons. The fact that the amines are in aqueous solution does not allow dehydration of the gas to be treated and has the drawback of moistening a gas which would be intrinsically dry or which would have already been dehydrated. In general, after deacidizing with a method using an amine solvent, the natural gas has to be dehydrated by means of an additional treatment using a glycol-based solvent. The necessity of using an additional treatment to dehydrate a natural gas deacidized by a method using a solvent containing amines is expensive and requires an additional infrastructure.

The present invention provides a deacidizing and dehydration method using an amine-containing solvent and avoiding the drawbacks of the prior art.

SUMMARY OF THE INVENTION

In general terms, the present invention relates to a method for treating a natural gas containing $H_2S$, wherein the following stages are carried out:

a) contacting said natural gas with a first solvent comprising amine so as to obtain an $H_2S$-depleted gas and an $H_2S$-laden solvent, b) contacting the $H_2S$-depleted gas obtained in stage a) with a second solvent comprising at least 90% by weight of amine so as to obtain a water-depleted gas and a water-laden solvent.

According to the invention, in stage a), the first solvent can comprise between 20% and 95% by weight of amine and, in stage b), the second solvent can comprise at least 95% by weight of amine. The $H_2S$-laden solvent obtained in stage a) and the water-laden solvent obtained in stage b) can be regenerated by means of a single regeneration circuit.

According to the invention, in stage a), said natural gas can be contacted with the first solvent comprising amine and water and with the water-laden solvent obtained in stage b), and the following stage can be carried out:

c) distilling the $H_2S$-laden solvent obtained in stage a) so as to obtain a first $H_2S$-laden steam and a regenerated solvent, a first part of said regenerated solvent being recycled to stage a) as first solvent, as well as one of the following stages d):

d) distilling, in the presence of hydrocarbons comprising more than five carbon atoms, a second part of the regenerated solvent obtained in stage c) so as to obtain a second steam and said second solvent, comprising at least 90% amine, used in stage b), or d) distilling, at a pressure below the atmospheric pressure, a second part of the regenerated solvent obtained in stage c) so as to obtain a second steam and said second solvent, comprising at least 90% amine, used in stage b).

The method according to the invention can also comprise the following stages:

c) distilling the $H_2S$-laden solvent obtained in stage a) and the water-laden solvent obtained in stage b) so as to obtain a first $H_2S$-laden steam and a regenerated solvent, a first part of said regenerated solvent being recycled to stage a) as first solvent, d) distilling, at a pressure below the atmospheric pressure, a second part of the regenerated solvent obtained in stage c) so as to obtain a second steam and said second solvent, comprising at least 90% amine, used in stage b).

According to the invention, in stage b), the second part can form between 1% and 50% by weight of said regenerated solvent obtained in stage c). Before stage c), said $H_2S$-laden solvent obtained in stage a) can be expanded so as to release $H_2S$.

If a vacuum distillation is carried out in stage d), distillation can be performed in a first distillation column in stage c), distillation can be performed in a second distillation column in stage d), and the following stages can be carried out:

e) cooling the second steam obtained in stage d) so as to obtain a liquid aqueous phase and a third $H_2S$-laden steam, f) feeding a first part of said aqueous phase obtained in stage e) to the top of the first column and feeding a second part of said liquid obtained in stage e). to the top of the second column.

If distillation is carried out in the presence of hydrocarbons in stage d), distillation can be performed in a first distillation column in stage c), distillation can be performed in a second distillation column in stage d), and the following stages can be carried out:

e) cooling the second steam obtained in stage d) so as to obtain a liquid aqueous phase, liquid hydrocarbons and a third $H_2S$-laden steam, f) feeding part of said aqueous phase obtained in stage e) to the top of the second column and feeding part of said hydrocarbons obtained in stage e) to the bottom of the second column.

The method according to the invention can comprise one of the following stages:

g) drawing the third steam obtained in stage e) by means of a steam ejector so as to obtain a stream containing water and $H_2S$, said stream being fed into the first column, or j) drawing the third steam obtained in stage e) by means of a vacuum pump.

The method according to the invention can comprise the following stages:

h) cooling the first steam obtained in stage c) so as to obtain a second water-containing liquid and a fourth $H_2S$-containing steam, i) feeding part of the second liquid obtained in stage h) to the top of the first column.

According to the invention, the amine can be selected from the group comprising methyldiethanolamine and dimethylethanolamine.

The method according to the present invention has the advantage of carrying out deacidizing and dehydration of a natural gas with a single solvent containing amines circulating in a single circuit. The gas treated by means of the method according to the invention requires no further dehydration treatment. This allows to save both money and space.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
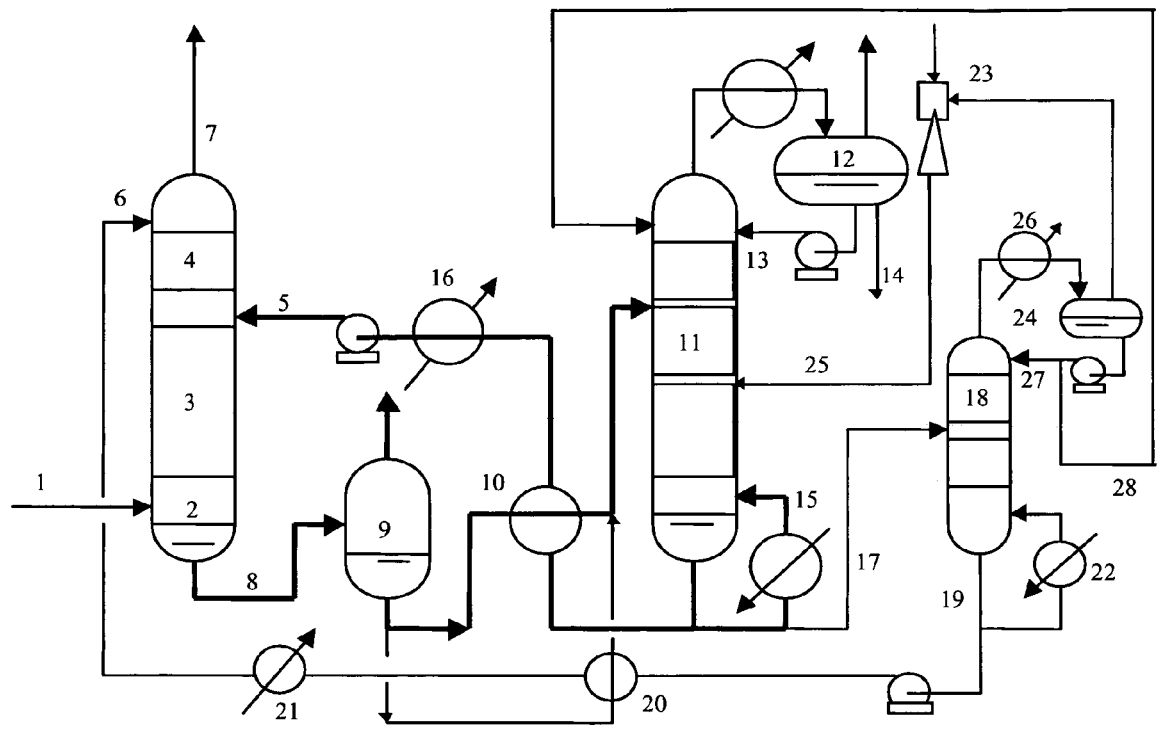
FIG. 1 diagrammatically shows a method according to the invention.

In FIG. 1, the natural gas containing water and acid compounds such as $H_2S$ and $CO_2$ flows through line 1 into absorption column 2. Column 2 comprises two absorption zones 3 and 4. Zones 3 and 4 can be superposed in a column. Absorption zones 3 and 4 can also be arranged in two different columns. First absorption zone 3 allows extraction of the acid compounds ($H_2S$ and possibly $CO_2$), second absorption zone 4 allows dehydration and possibly ultimate deacidizing of the gas. The gas flowing in through line 1 is brought into countercurrent contact in zone 3 with a regenerated solvent introduced through line 5. The solvent consists of an aqueous amine solution allowing absorption of the acid compounds ($H_2S$ and possibly $CO_2$) contained in the natural gas. A deacidized water-saturated gas is obtained at the top of zone 3 and fed to zone 4. The solvent containing acid compounds ($H_2S$ and possibly $CO_2$) collected at the bottom of zone 3 is discharged through line 8. The gas fed into zone 4 is brought into countercurrent contact with a solvent introduced through line 6. The solvent introduced through line 6 is rich in amine, i.e. it contains at least 90% and preferably more than 95% or 98% by weight of amine. The hygroscopic nature and the high solubility capacity of water in anhydrous amines allows the amine-rich solvent to absorb the water contained in the gas. In zone 4, the amine-rich solvent also allows to absorb the acid compounds ($H_2S$ and possibly $CO_2$) remaining in the gas. The gas leaving the top of absorption zone 4 through line 7 is deacidized and dehydrated according to the standards required for further use. The solvent recovered at the bottom of absorption zone 4 consists of amine, water and possibly $H_2S$ or $CO_2$ as traces. It can also be directly fed to the top of absorption zone 3.

The absorption column can comprise additional acid gas absorption zones. The absorption zones can be arranged in a single column or in different columns. The absorption zones can comprises different types of trays and/or packings, random and/or stacked. The absorption zones can also consist of a contactor mixer working under cocurrent conditions, as described in U.S. Pat. No. 6,284,024.

The solvent circulating in line 8 is expanded, then fed into flash drum 9. Acid compounds ($H_2S$ and $CO_2$) and hydrocarbons released through solvent expansion are discharged at the top of drum 9. The liquid part of the expanded solvent is discharged at the bottom of drum 9, heated by heat exchange in exchanger 10 and/or 20, and fed into regeneration column 11. In column 11, the acid compounds ($H_2S$ and $CO_2$) are extracted from the aqueous amine solution. The steam stream generated by reboiler 15 at the bottom of column 11 extracts by entrainment, i.e. stripping, the acid compounds. The steam at the top of column 11 contains acid compounds. It is condensed by cooling in a heat exchanger, then fed into drum 12. The acid gases are discharged from the top of drum 12. Part of the condensed water is fed through line 13 to the top of column 11 as reflux. The remaining water is discharged through line 14. This provides an additional advantage: the method according to the invention requires no pure makeup water. On the contrary, an amount of water which depends on the degree of moisture of the natural gas flowing in through line 1 has to be discharged. The regenerated solvent, i.e. freed of the acid compounds, is available at the bottom of column 11. It can consist of an aqueous solution containing between 20% and 95% by weight of amine, preferably between 20% and 80% by weight of amine. A first part of the regenerated solvent, for example between 50% and 99% by weight of the solvent from the bottom of column 11, is cooled by heat exchange in exchangers 10 and 16, then fed through line 5 to the top of absorption zone 3.

A second part of the regenerated solvent, for example between 1% and 50% by weight of the solvent from the bottom of column 11, is fed through line 17 into vacuum distillation column 18. Column 18 is maintained at a pressure lower than the atmospheric pressure, preferably at a pressure below 0.09 MPa or 0.04 MPa. Reboiler 22 allows to heat the solvent at the bottom of column 18 so as to extract the water from the amine by vaporization. The steam and the residual acid compound traces are discharged from the top of column 18. A solvent substantially free of water and of acid compounds is discharged at the bottom of column 18 through line 19, then cooled by heat exchangers 20 and 21, and fed through line 6 to the top of absorption column 4.

The steam discharged from the top of column 18 is partly condensed by cooling in heat exchanger 26. In drum 24, the liquid water is separated from the gas containing $H_2S$ and $CO_2$. Part of the liquid water is sent through line 27 to the top of column 18 as reflux, and another part of the liquid water is sent through line 28 to the top of column 11 as reflux. The gas contained in drum 24 is drawn by means of ejector 23 using a medium-pressure steam flux. Thus, ejector 23 maintains column 18 under vacuum. The stream discharged from ejector 23 is fed into column 11 through line 25. The introduction point of line 25 in column 11 is so selected as to allow separation of the $H_2S$ and $CO_2$ compounds. Moreover, the steam fed through line 25 is used to carry along the acid compounds in the same way as the steam stream generated by reboiler 15.

Figure 2:
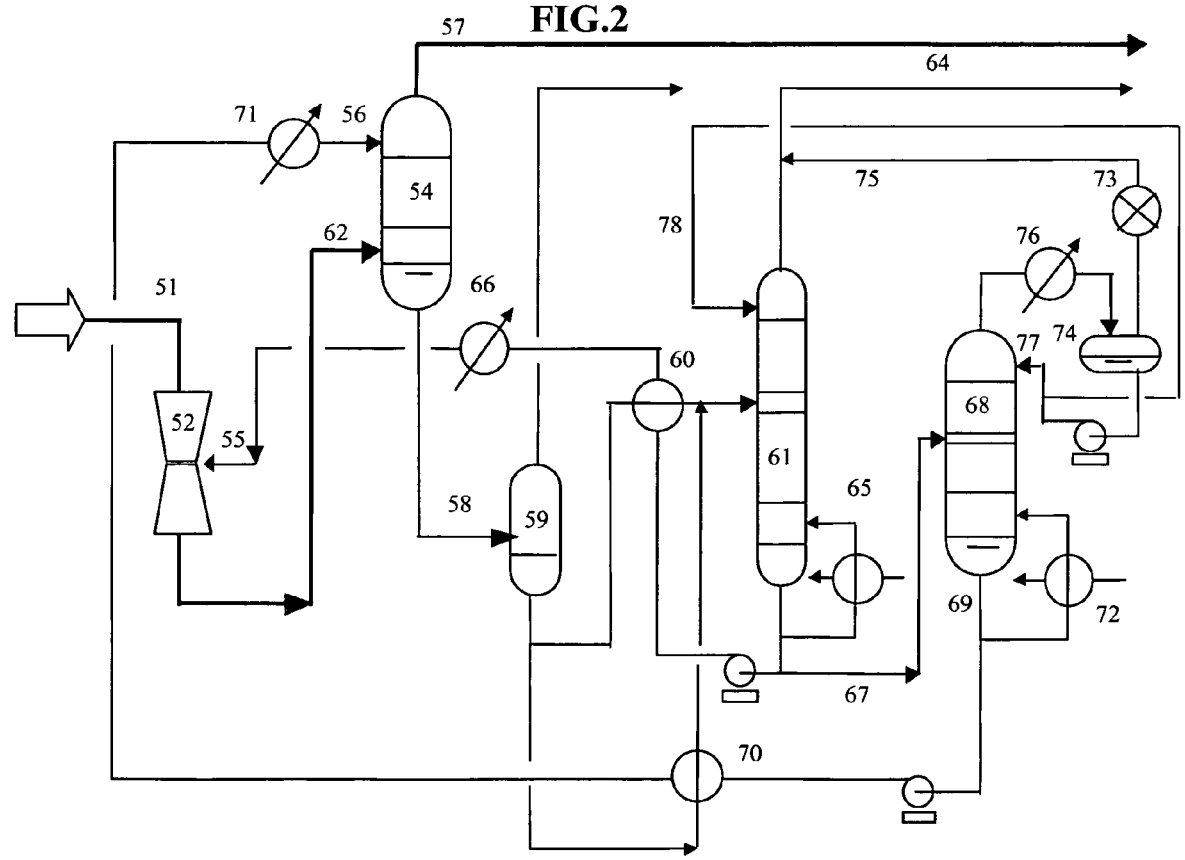
FIGS. 2 and 3 diagrammatically show variants of the method according to the invention.

The method diagrammatically shown in FIG. 2 is suited for gas treatment on an offshore platform, the natural gas containing water and acid compounds such as $H_2S$ and $CO_2$ flows through line 51 into compact contactor 52. Contactor 52 can be horizontal or vertical, for example a contactor marketed by the ProPure company and described in document U.S. Pat. No. 6,284,024. In contactor 52, the natural gas is brought into cocurrent contact with a solvent flowing in through line 55 so as to absorb the $H_2S$ as much as possible. The contacting time between the natural gas and the solvent is very short, for example between 50 ms and 5 s, so as to obtain very selective absorption of the $H_2S$ and to absorb a very small amount of $CO_2$. The mixture of liquid solvent and of gas from contactor 52 is fed into absorption column 54 by means of line 62. The H$_2$S-containing liquid solvent is collected at the bottom of column 54, then discharged through line 58.

In column 54, the steam-saturated gas is brought into countercurrent contact with a solvent flowing in through line 56. The amine-rich solvent contains no or very little water and H$_2$S. The solvent contains at least 90% by weight of amine, preferably more than 95% or 98%. by weight of amine. The amine-rich solvent allows to collect the water of the gas owing to the hygroscopic nature of amines and to the high solubility of water in anhydrous amines. The water-collecting amine also absorbs the remaining H$_2$S traces in the gas from contactor 52 and thus allows to obtain a natural gas with an H$_2$S content required for transportation by pipeline (approximately less than 3 ppm H$_2$S). The gas discharged through line 57 at the top of column 54 is deacidized and dehydrated. The water-containing solvent is recovered at the bottom of column 54. It is discharged, with the liquid solvent from line 62, through line 58.

The solvent circulating in line 58 is expanded in flash drum 59 to release acid gases and hydrocarbons discharged from the top of drum 59. The liquid solvent from the bottom of drum 59 is heated in heat exchanger 60 and/or 70, then fed into regeneration column 61. A water reflux is fed through line 78 to the top of column 61. The steam stream generated by reboiler 65 at the bottom of column 61 extracts the acid compounds (H$_2$S and CO$_2$) by entrainment, i.e. stripping. The steam containing acid compounds is discharged from the top of column 61 through line 64 for example to an incinerator. The regenerated solvent at the bottom of column 61 contains amines, water, and it is free of the acid compounds. It contains between 20% and 95% by weight of amine, preferably between 20% and 80% by weight of amine. A first part of the regenerated solvent, for example between 50% and 99% by weight of the solvent from the bottom of column 61, is cooled by heat exchange in exchanger 60 with the solvent from the bottom of drum 59, then cooled in exchanger 66, and fed through line 55 into contactor 52.

A second part of the regenerated solvent, for example between 1% and 50% by weight of the solvent from the bottom of column 61, is fed through line 67 into vacuum distillation column 68. Column 68 is maintained under vacuum at a pressure lower than the atmospheric pressure, preferably below 0.09 MPa or 0.04 MPa. Reboiler 72 allows to heat the solvent at the bottom of column 68 in order to extract the water by vaporization. The steam and the residual acid compound traces are discharged at the top of column 68. A solvent substantially free of water and of acid compounds is discharged from the bottom of column 68 through line 69, then cooled by heat exchangers 70 and 71, and fed through line 56 to the top of absorption column 54.

The steam discharged from the top of column 68 is partly condensed by cooling in heat exchanger 76. In drum 74, the liquid water is separated from the gas containing H$_2$S and CO$_2$. Part of the liquid water is sent through line 77 to the top of column 68 as reflux, another part of the liquid water is sent through line 78 to the top of column 61 as reflux. The gas contained in drum 74 is drawn by means of vacuum pump 73, then discharged through lines 75 and 64.

A hot oil available on an offshore platform can be used as source of heat by reboilers 65 and 72.

The solvent used in the method according to the invention can contain an amine selected from the tertiary alkanolamines of R'R"R'"N type, where R' can be a methyl or ethyl group, R" can be a methyl or ethyl group or an alcohol, and R'" is an alcohol. A solvent containing methyldiethanolamine (MDEA) and/or dimethylethanolamine (DMEA) is preferably used because these amines have a low viscosity (the viscosity of a solution of 100% MDEA at 40° C. is 0.03 Pa.s), which facilitates contacting of the solvent with the gas to be treated, notably in absorption zone 4 of FIG. 1 and in absorption column 54 of FIG. 2.

The table hereafter gives a material balance for the method diagrammatically shown in FIG. 1. The temperature is expressed in ° C., the pressure P in MPa and the composition in CO2, H2S, H2O, N2, C1, C2, C3, iC4, nC4, iC5, nC5, nC6, nC7, nC8, MDEA in kmol/h of the fluids circulating in various lines.

| | Line No. | | | |
|---|---|---|---|---|
| | 1 | 7 | 6 | 5 |
| T | 44 | 51 | 50.4 | 50.4 |
| P | 7 | 7 | 7 | 7 |
| CO2 | 240.67 | 15.87 | | 22.33 |
| H2S | 1474.07 | 0.01 | | 105.82 |
| H2O | 9.71 | 0.82 | 32.08 | 24118.93 |
| N2 | 61.42 | 61.17 | | |
| C1 | 4073.55 | 4018.93 | | |
| C2 | 795.29 | 780.85 | | |
| C3 | 453.94 | 449.60 | | |
| iC4 | 57.25 | 56.61 | | |
| nC4 | 111.41 | 110.29 | | |
| iC5 | 29.74 | 29.48 | | |
| nC5 | 24.16 | 23.96 | | |
| nC6 | 6.26 | 6.18 | | |
| nC7 | 0.73 | 0.70 | | |
| nC8 | 0.41 | 0.40 | | |
| MDEA | 0.00 | 0.00 | 302.71 | 2727.48 |
| Total | 7338.62 | 5554.87 | 334.79 | 26974.57 |

In order to obtain the material balance shown in the table, the bottom of column 11 is maintained at a temperature of 128.7° C. and at a pressure of 0.24 MPa abs., the bottom of column 18 is maintained at a temperature of 100° C. and at a pressure of 0.01 MPa abs.

In general, absorption zones 3, 4 and 54 and contactor 52 can work at a pressure above 3 MPa abs. and at a temperature ranging between 0° C. and 80° C. Regeneration columns 11 and 61 can work at low pressure, i.e. at a pressure below 1 MPa abs. The temperatures of regeneration columns 11 and 61, and of distillation columns 18 and 68 should not exceed the degradation temperature of the amine contained in the solvent. Columns 11, 61, 18 and 61 can for example be maintained at a temperature below 140° C.

Figure 3:
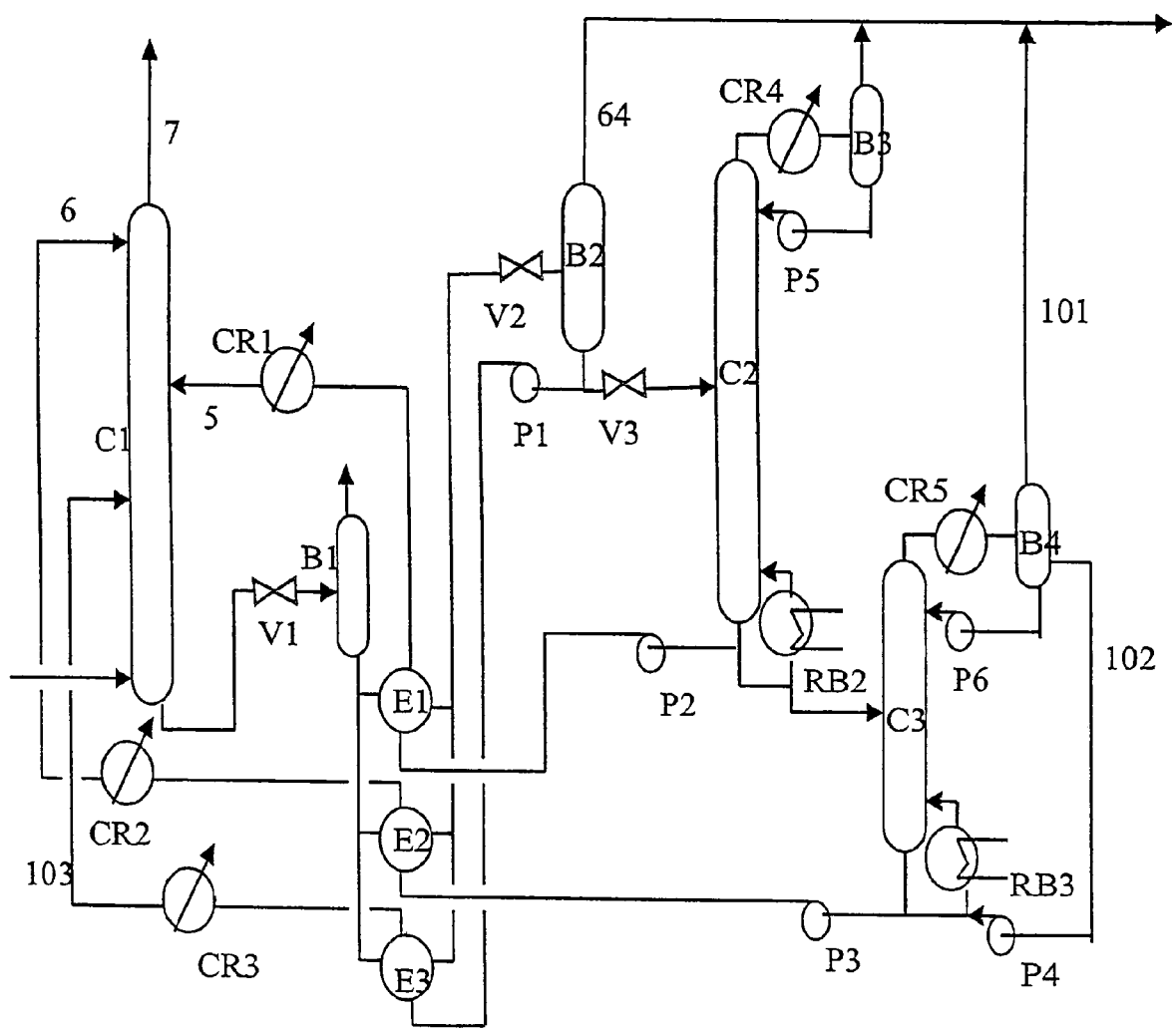

FIG. 3 diagrammatically shows a variant of the method for regenerating the solvent containing acid compounds (H$_2$S and/or CO$_2$) and water.

The natural gas fed into absorption column C1 through line 1 is treated in the same way as in column 2 shown in FIG. 1.

The solvent from the bottom of column C1 is expanded through valve V1 so as to release in drum B1 part of the co-absorbed hydrocarbons. The hydrocarbons are discharged at the top of drum B1. The solvent from the bottom of drum B1 is depleted in hydrocarbons. It is cooled in heat exchangers E1, E2 and/or E3, then expanded through valve V2 so as to release acid gases (H$_2$S and/or CO$_2$), then fed into drum B2. The acid gases are discharged from the top of drum B2 through line 64. The solvent at the bottom of drum B2 is depleted in acid compounds.

A first part of the solvent from the bottom of drum B2 can be sent by means of pump P1, and after cooling in heat exchangers E3, then CR3 (exchange with an ambient medium such as water or air), into absorption column C1. The point of-introduction of this first part of the solvent in column C1 can be located between the bottom of C1 and the point of introduction of line 5 in C1. A second part of the solvent from the bottom of drum B2 is expanded to a pressure close to the atmospheric pressure, for example a pressure ranging between 0.1 MPa and 1 MPa abs., then it is fed into regeneration column C2.

The solvent is distilled in column C2. The acid compound-containing steam obtained at the top of column C2 is partly condensed by cooling in heat exchanger CR4. The acid gases are discharged from the top of drum B3, the condensate is sent to the top of column C2 by pump P5. Reboiler RB2 allows to heat the solvent at the bottom of column C2. The regenerated solvent obtained at the bottom of column C2 can contain between 20% and 95% by weight of amine, preferably between 20% and 80% by weight of amine.

A first part of the regenerated solvent obtained at the bottom of column C2 is cooled in heat exchangers E1 and CR1, then sent by means of pump P2 and line 5 to column C1.

A second part of the regenerated solvent obtained at the bottom of column C2 is fed into purification column C3. Column C3 allows to separate the water from the amine by stripping, for example by means of a light gasoline, i.e. the vaporized gasoline carries the water to the top of column C3. The light gasoline can consist of hydrocarbons having more than five carbon atoms. A reboiler heats the solvent at the bottom of column C3. Column C3 can work at a pressure close to the pressure of column C2, i.e. between 0.1 MPa and 1 MPa abs. The vapour obtained at the top of column C3 contains at least gasoline, water and acid compounds. It is cooled in heat exchanger CR5, then fed into drum B4. The acid gases are discharged from the top of drum B4 through line 101. The aqueous phase obtained at the bottom of drum B4 is fed to the top of column C3. The liquid hydrocarbons obtained in drum B4 are fed to the bottom of column C3 by means of pump P4 and line 102, for example after being vaporized by reboiler RB3. Make-up light gasoline can be fed into line 102. The purified solvent obtained at the bottom of column C3 is cooled in heat exchangers E2 and CR2, then fed to the top of absorption column C1 by means of pump P3 and line 6.

Without departing from the scope of the invention, column C3 can be replaced by a pervaporation module. The aqueous phase is then transferred in the vapour phase through a membrane, then condensed, whereas the amine phase is concentrated.

The invention claimed is:

1. A method for treating a natural gas containing $H_2S$, wherein the following stages are carried out:
   a) contacting said natural gas with a first solvent comprising between 20% and 95% by weight of amine so as to obtain an $H_2S$-depleted gas and an $H_2S$-laden solvent,
   b) dehydrating the $H_2S$-depleted gas by contacting the $H_2S$-depleted gas obtained in stage a) with a second solvent comprising at least 90% by weight of amine so as to obtain a water-depleted gas and a water-laden solvent,
   regenerating the $H_2S$-laden solvent obtained in stage a) and the water-laden solvent obtained in stage b) by a single regeneration circuit to form a regenerated solvent, and
   recycling a first part of the regenerated solvent to stage a) as the first solvent, and recycling a second part of the regenerated solvent to stage b) as the second solvent,
   wherein said amine of the first and second solvents is selected from the group consisting of tertiary alkanolamines having a low viscosity which facilitates contacting solvents with gas.

2. A method as claimed in claim 1 wherein, in stage b), the second solvent comprises at least 95% by weight of amine.

3. A method as claimed in claim 1 wherein, in stage a), said natural gas is contacted with the first solvent comprising amine and water and with the water-laden solvent obtained in stage b), and wherein the stages of regenerating and recycling comprise:
   c) distilling the $H_2S$-laden solvent obtained in stage a) so as to obtain a first $H_2S$-laden steam and the regenerated solvent, the first part of the regenerated solvent being recycled to stage a) as the first solvent.

4. A method as claimed in claim 3, wherein the stages of regenerating and recycling further comprise:
   d) distilling, in the presence of hydrocarbons comprising more than five carbon atoms, the second part of the regenerated solvent obtained in stage c) so as to obtain a second steam and said second solvent, comprising at least 90% amine, used in stage b).

5. A method as claimed in claim 3, wherein the stages of regenerating and recycling further comprise:
   d) distilling, at a pressure below the atmospheric pressure, the second part of the regenerated solvent obtained in stage c) so as to obtain a second steam and said second solvent, comprising at least 90% amine, used in stage b).

6. A method as claimed in claim 1, wherein the stages of regenerating and recycling comprise:
   c) distilling the $H_2S$-laden solvent obtained in stage a) and the water-laden solvent obtained in stage b) so as to obtain a first $H_2S$-laden steam and the regenerated solvent, the first part of said regenerated solvent being recycled to stage a) as first solvent,
   d) distilling, at a pressure below the atmopsheric pressure, the second part of the regenerated solvent obtained in stage c) so as to obtain a second steam and said second solvent, comprising at least 90% amine, used in stage b).

7. A method as claimed in claim 3 wherein, in stage b), said second part forms between 1% and 50% by weight of said regenerated solvent obtained in stage c).

8. A method as claimed in claim 3 wherein, before stage c), said $H_2S$-laden solvent obtained in stage a) is expanded in order to release $H_2S$.

9. A method as claimed in claim 5 wherein, in stage c), distillation is carried out in a first distillation column and, in stage d), distillation is carried out in a second distillation column, and wherein the following stages are carried out:
   e) cooling the second steam obtained in stage d) so as to obtain a liquid aqueous phase and a third $H_2S$-laden steam,
   f) feeding a first part of said aqueous phase obtained in stage e) to the top of the first column and feeding a second part of said liquid obtained in stage e) to the top of the second column.

10. A method as claimed in claim 6 wherein, in stage c), distillation is carried out in a first distillation column and, in stage d), distillation is carried out in a second distillation column, and wherein the following stages are carried out:
  e) cooling the second steam obtained in stage d) so as to obtain a liquid aqueous phase and a third $H_2S$-laden steam,
  f) feeding a first part of said aqueous phase obtained in stage e) to the top of the first column and feeding a second part of said liquid obtained in stage e) to the top of the second column.

11. A method as claimed in claim 4 wherein, in stage c), distillation is carried out in a first distillation column and, in stage d), distillation is carried out in a second distillation column, and wherein the following stages are carried out:
  e) cooling the second steam obtained in stage d) so as to obtain a liquid aqueous phase, liquid hydrocarbons and a third $H_2S$-laden steam,
  f) feeding part of said aqueous phase obtained in stage e) to the top of the second column and feeding part of said hydrocarbons obtained in stage e) to the bottom of the second column.

12. A method as claimed in claim 9, wherein the following stage is carried out:
  g) drawing the third steam obtained in stage e) by means of a steam ejector so as to obtain a stream containing water and $H_2S$, said stream being fed into the first column.

13. A method as claimed in claim 9, wherein the following stages are carried out:
  h) cooling the first steam obtained in stage c) so as to obtain a second water-containing liquid and a fourth $H_2S$-laden steam,
  i) feeding part of the second liquid obtained in stage h) to the top of the first column.

14. A method as claimed in claim 9, wherein the following stage is carried out:
  j) drawing the third steam obtained in stage e) by means of a vacuum pump.

15. A method as claimed in claim 1, wherein the amine is selected from the group consisting of methyldiethanolamine and dimethylethanolarnine.

16. A method as claimed in claim 1, wherein the second solvent is different from the first solvent.

17. A method as claimed in claim 11, wherein the second solvent has a higher amine concentration than the first solvent.

18. A method as claimed in claim 17, wherein, in stage b) the second solvent comprises at least 98% by weight of amine.

19. A method as claimed in claim 17 wherein, in stage b), the second solvent comprises at least 95% by weight of amine.

* * * * *